United States Patent
Nakamura (10) Patent No.: US 6,835,137 B1
(45) Date of Patent: Dec. 28, 2004

(54) GAME APPARATUS AND COMMUNICATION GAME SYSTEM

(75) Inventor: Takashi Nakamura, Tokyo (JP)

(73) Assignee: Namco Limited, Tokyo (JP)

( * ) Notice: Subject to any disclaimer, the term of this patent is extended or adjusted under 35 U.S.C. 154(b) by 0 days.

(21) Appl. No.: 09/509,968

(22) PCT Filed: Aug. 5, 1999

(86) PCT No.: PCT/JP99/04226

§ 371 (c)(1),
(2), (4) Date: Apr. 17, 2001

(30) Foreign Application Priority Data

Aug. 6, 1998 (JP) .......................................... 10-222533

(51) Int. Cl.[7] ................................................. A63F 9/22
(52) U.S. Cl. ...................................................... 463/42
(58) Field of Search ............................... 463/1, 30, 31, 463/40–44; 434/247–254, 257; 473/219, 221

(56) References Cited

U.S. PATENT DOCUMENTS

| 5,586,937 | A | * | 12/1996 | Menashe | 463/41 |
| 5,890,906 | A | * | 4/1999 | Macri et al. | 434/247 |
| 5,899,810 | A | * | 5/1999 | Smith | 463/42 |
| 5,971,855 | A | * | 10/1999 | Ng | 463/42 |
| 6,012,984 | A | * | 1/2000 | Roseman | 463/42 |
| 6,042,477 | A | * | 3/2000 | Addink | 463/42 |
| 6,179,713 | B1 | * | 1/2001 | James et al. | 463/42 |
| 6,183,367 | B1 | * | 2/2001 | Kaji et al. | 463/42 |
| 6,264,562 | B1 | * | 7/2001 | McSheffrey et al. | 463/42 |
| 6,287,202 | B1 | * | 9/2001 | Pascal et al. | 463/42 |

FOREIGN PATENT DOCUMENTS

JP 10-85457 4/1998

* cited by examiner

*Primary Examiner*—Mark Sager
*Assistant Examiner*—Steven Ashburn
(74) *Attorney, Agent, or Firm*—Morrison & Foerster LLP (57) ABSTRACT

Replay data for replaying the process during which a player played a game is downloaded via a network, and the player can actually play the game while playing back the replay data. No real-time play process information is exchanged, but the game result data of the player and the replay data for replaying the game process can be communicated at the end of the game, and these data are stored in the terminal game machine. At the time of the game, any player plays the game while playing back the replay data.

5 Claims, 9 Drawing Sheets

GAME APPARATUS AND COMMUNICATION GAME SYSTEM

TECHNICAL FIELD

The present invention relates to a game apparatus and communication game system which download game replay data by non-real-time communications and use the downloaded data for games.

BACKGROUND ART

Some arcade game machines installed in so-called game centers (to be simply referred to as locations hereinafter) can communicate with other game machines to perform communication games that users can play. The current communication games are limited to battle games using local communications between a plurality of game machines installed in a location. These games progress when a plurality of players simultaneous play games or cooperate with each other in real time. In this case, since the game machines are installed within a single location, they can be connected via high-speed data communications.

Network games based on communications via the Internet are known on PCs (Personal Computers). Demand has arisen for middle- or large-size games suitable for broad networks.

The following game is available for home game machines. Game results are transmitted to a host computer using non-real-time communications, and the host computer totalizes the game results. The home game machines receive the totalization results to compete in the game results.

When a game in the above-described form (real time type), which allows players to simultaneously play, is directly applied to game machines connected to a network such as a broad network capable of performing only relatively low-speed data communications, the problems in latency (communication delay), difference in time, communication quality, and the like occur. This game is not suitable for business in a location.

The above problems will be described below. First of all, the problem of latency (communication delay) will be described. Latency (communication delay) occurs due to a communication distance and signal passage via a relay device. Wire, radio, and optical communications are available. Even if one of them is employed, latency corresponding to a distance occurs, provided that the distance increases. The progress of a real-time game is interfered with the influence of this communication delay. Players may not often play this game in practice.

The problem of the difference in time will be described. Assume that locations open for the business hours from 12:00 noon to 12:00 midnight are located in Japan, London, New York, and Los Angeles. These locations rarely have the overlapping zones (simultaneously) of the business hours. The time zones when customers get together in the locations rarely overlap. Players at the home game machines and PCs (Personal Computers) can join a game any convenient time (even midnight or early morning). It is difficult to realize a worldwide communication game in the form of simultaneous participation in a location in the business form of a shop.

The problem of communication quality will be described. In broad communications, plays using the Internet on PCs are very popular, but communication quality is not guaranteed. Communications may be interrupted during the play in which players simultaneously join. In this case, this game no longer plays a role as a game. Players at PCs play an Internet game for personal pleasure and give up playing this game even if the communications are interrupted due to troubles in providers and communication rotues. When communications are interrupted in the arcade game machines installed in a location, and the customers cannot continue the game, troubles may occur between the customers and location.

In a game with which the players at the home game machines compete with each other in game results using non-real-time communications, each player intentionally connects the game machine to a predetermined host machine at the end of the game to upload the game result and downloads the totalization result. There is no conventional system for making the home game machine automatically transmit a game result when the game result is updated and automatically transmitting the updated totalization result to the home game machine. The upload contents are limited to only the game result (e.g., a score), and no game process can be transmitted.

DISCLOSURE OF INVENTION

The present invention has been made in consideration of the problems in the above-mentioned prior arts, and has as its object to provide a game apparatus and communication game system capable of allowing a communication game as if players at remote game machines were playing the game without posing the problems of latency (communication delay), difference in time, communication quality, and the like occurring in a real-time communication game.

In order to achieve the above object, a game apparatus according to claim 1 is characterized by comprising means for downloading, via a network, replay data for replaying a play process of a game of a player and game execution playback means for playing back the downloaded replay data and at the same time executing a game play by the player.

The invention of claim 2 is a communication game system having a plurality of terminal game machines connected to a network and a host computer, characterized in that each of the plurality of terminal game machines comprises storage means for obtaining and storing replay data for replaying a process of a game play when each player plays a game at a corresponding one of the terminal game machines, transmission means for automatically transmitting the replay data stored in the storage means to the host computer, reception means for receiving the replay data automatically transmitted from the host computer, storage means for storing the received replay data, and game execution playback means for playing back the received replay data stored in the storage means and executing the game play by the player, and the host computer comprises storage means for storing the replay data transmitted from each of the plurality of terminal game machines and transmission means for automatically transmitting the replay data stored in the storage means to each of the plurality of terminal game machines.

The invention according to claim 3 is a communication game system having a plurality of terminal game machines connected to a network and a host computer, characterized in that each of the plurality of terminal game machines comprises storage means for obtaining and storing result data and replay data for replaying a process of a game play when each player plays a game at a corresponding one of the terminal game machines, transmission means for automatically transmitting the result data and replay data stored in the storage means to the host computer, reception means for receiving totalization data automatically transmitted from the host computer, storage means for storing the received totalization data, and game execution playback means for reading out and playing back the replay data from the received totalization data stored in the storage means and at the same time executing the game play by the player, and the host computer comprises totalization means for totalizing, on the basis of the result data, the result data and replay data transmitted from each of the plurality of terminal game machines, and generating totalization data containing the result data and replay data, storage means for storing the generated totalization data, and transmission means for automatically transmitting the totalization data stored in the storage means to each of the plurality of terminal game machines.

The invention according to claim 4 is the communication game system in claim 2 or 3, characterized in that the terminal game machine has an interface connecting detachable storage means to allow data readout, the game execution playback means of the terminal game machine reads out player character information serving as information associated with a game character and stored in the detachable storage means and reflects the readout player character information on the game, and the transmission means of the terminal game machine makes data transmitted to the host computer contain the player character information, and transmits the resultant data.

The invention according to claim 5 is the communication game system in claim 4, characterized in that the player character information stored in the detachable storage means is created and stored by a game machine not connected to the network but having an interface connecting the detachable storage means and reading/writing data. More specifically, the following form can be employed. A memory card used in a home game machine is used, and player character information created by the home game machine is saved in the memory card. This memory card is carried to the location where a arcade game machine according to the present invention is installed. The memory card is then set in the arcade game machine, and the player character information is read out from the memory card and reflected on the game.

The invention according to claim 6 is the communication game system in claim 2 or 3, characterized in that the terminal game machine comprises image sensing means for obtaining image data obtained by sensing an image of a game player who plays the game, the transmission means of the terminal game machine makes data transmitted to the host computer contain the image data and transmits the resultant data, the transmission means of the host computer makes data transmitted to the plurality of terminal game machines contain the image data and transmits the resultant data, and the game execution playback means of the terminal game machine displays the image data corresponding to the replay data in playing back the replay data.

The host computer of the present invention may be a computer independent of the terminal game machine or may have a form in which the function of the host computer of the present invention is provided in any terminal game machine. The communication between the host computer and each terminal game machine is automatically performed at an arbitrary timing independently of execution processing of the game in the terminal game machine. This communication is performed without influencing the execution of the game (i.e., without loading a CPU). For example, communication is performed in the background of the game processing at a low communication rate or in a non-business time zone at night.

BEST MODE OF CARRYING OUT THE INVENTION

A preferred embodiment of the present invention will be described with reference to the accompanying drawings.

Figure 1:
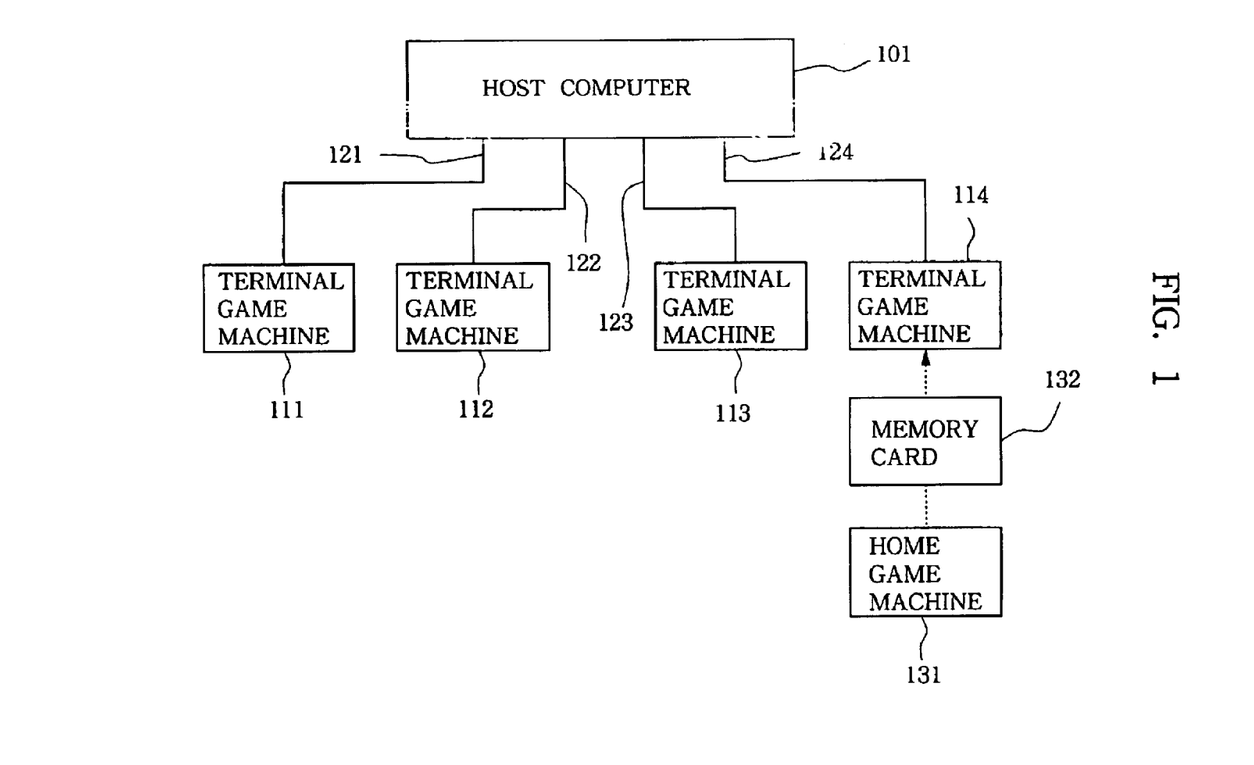
FIG. 1 is a schematic view showing the arrangement of a communication game system according to the present invention.

FIG. 1 shows the schematic arrangement of a communication game system according to the present invention. Terminal game machines 111 to 114 are connected to a host computer 101. The terminal game machines 111 to 114 are connected to the host computer 101, respectively, via single lines 121 to 124 in FIG. 1. However, any connection form such as direct connection using I/O ports, connection via a small network such as a LAN (Local Area Network), or connection via a broad network such as the Internet may be employed. Since the present invention is suitable for game machines connected via a broad network such as the Internet, the following description assumes that the host computer 101 is connected to the terminal game machines 111 to 114 via the broad network. Connection devices and computers for interfacing communications may be arranged in the layers between the host computer 101 and terminal game machines 111 to 114.

The terminal game machines 111 to 114 are arcade game machines distributed in areas having differences in time such as Japan, London, New York, and Los Angeles. Game players play games at the corresponding terminal game machines. In particular, the terminal game machine 114 has the memory card read/write function of reading via a memory card 132 character information created by a home game machine 131 and allowing reflecting the read character information on the game at the terminal game machine 114. Note that the four terminal game machines are connected to the host computer 101, but an arbitrary number of terminal gam machines may be connected to the host computer 101. The presence/absence of the read/write function of the memory card 132 of a terminal game machine to be connected is arbitrarily determined. The functions and processing of the host computer 101 and each terminal game machine will be described below, and the function of the host computer may be provided in any terminal game machine.

Figure 2:
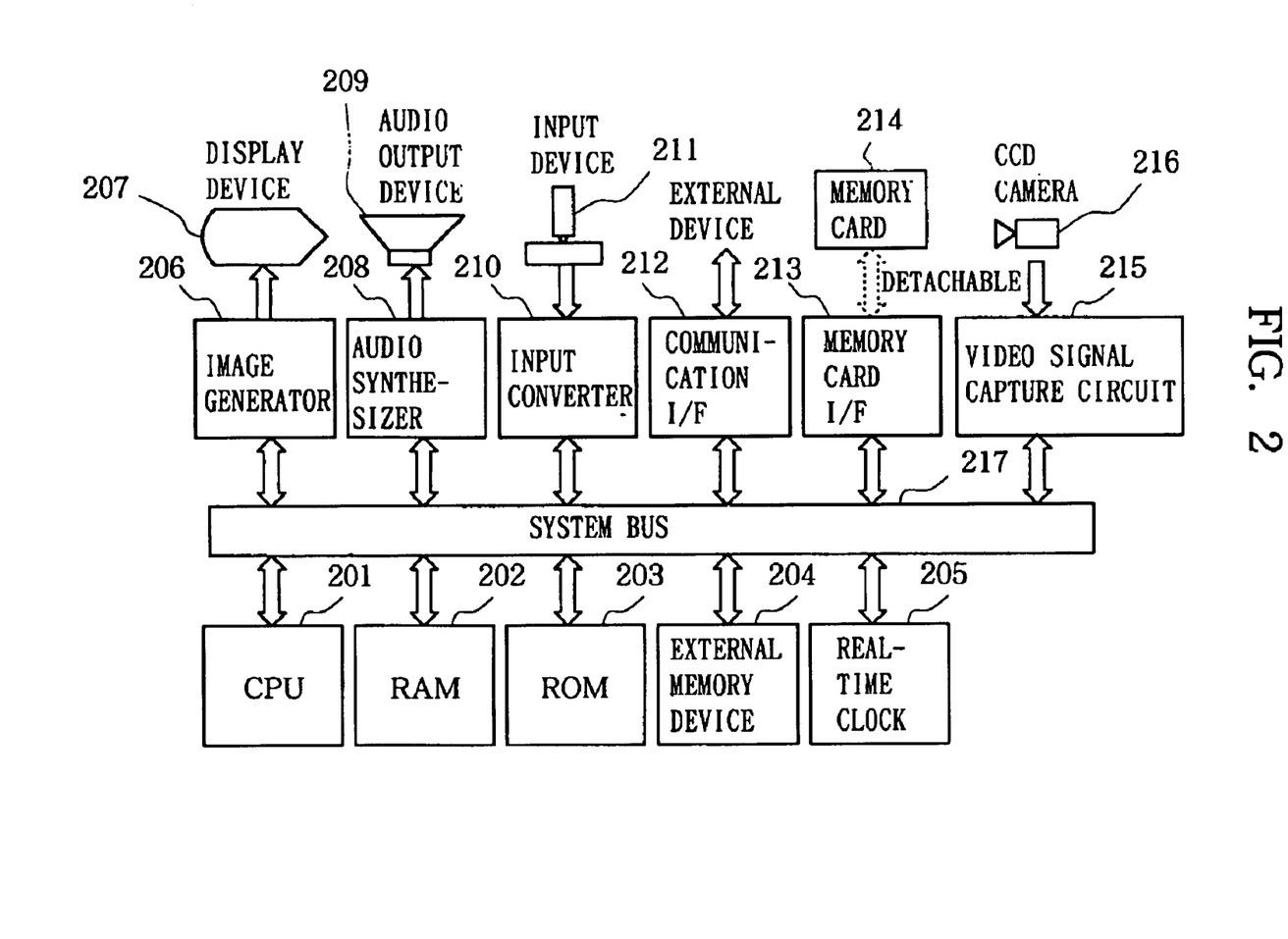
FIG. 2 is a block diagram showing the arrangement of a terminal game machine.

FIG. 2 shows the arrangement of each of the terminal game machines 111 to 114. Each terminal game machine comprises a central processing unit (CPU) 201, random access memory (RAM) 202, read-only memory (ROM) 203, external memory device 204, real-time clock 205, image generator 206, display device 207, audio synthesizer 208, audio output device 209, input converter 210, input device 211, communication interface (I/F) 212, memory card I/F 213, video signal capturing circuit 215, and CCD camera 216. The CPU 201, RAM 202, ROM 203, external memory device 204, real-time clock 205, image generator 206, audio synthesizer 208, input converter 210, communication I/F 212, memory card I/F 213, and video signal capturing circuit 215 are connected to a system bus 217. The terminal game machine 114 having the memory card read/write function shown in FIG. 1 has a memory card I/F 213. The remaining terminal game machines 111 to 113 have no memory card I/Fs 213, but FIG. 2 shows an arrangement having the memory card I/F 213. The following description concerning the operation of the terminal game machine is based on the terminal game machine having the memory card I/F 213. The operation of the terminal game machine having no memory card I/F 213 will be described excluding the part concerning the explanation of the memory card from the operation of the terminal game machine having the memory card I/F 213.

The CPU 201 controls the overall operation of this terminal game machine. The RAM 202 serves as a programmable memory used as a work area in operating the CPU 201. The ROM 203 is comprised of a read-only memory which stores various control programs (BIOS: Basic Input/Output System) executed by the CPU 201. The external memory device 204 is comprised of a memory device for storing game programs and various other data. A hard disk or CD-ROM is exemplified as the external memory device 204, but such a memory device must be at least partially read- or write-accessed. The real-time clock 205 is comprised of a clock for determining the current time and date or counting an arbitrary time interval.

The image generator 206 generates various images on the basis of an instruction from the CPU 201 and displays them on the display device 207. The audio synthesizer 208 outputs various audio data (including sound effects and background music) to the audio output device 209 on the basis of an instruction from the CPU 201. The input converter 210 obtains operation information from the input device 211 operated by the player, converts the operation information into digital data, and outputs the digital data to the CPU 201. The CPU 201 detects the operation information representing the operation of the operation device 211 by the player. The communication I/F 212 is comprised of an interface circuit for communicating with an external device, and more particularly the host computer 101. The memory card I/F 213 is comprised of an interface circuit for reading out data from the detachable memory card 132 or writing the data in it in accordance with an instruction from the CPU 201. The video signal capture circuit 215 captures a video signal sensed by the CCD camera 216, converts the video signal into digital data, and outputs it to the CPU 201. Although the various communication I/Fs 212 and 213 are connected to the bus line 217, as illustrated in FIG. 2, the communication I/Fs can have arbitrary forms and schemes. For example, an interface (e.g., a Universal Serial Bus) for connecting external devices in a daizy chain may be employed.

In the terminal game machine having the arrangement shown in FIG. 2, the CPU 201 loads the game program and necessary data from the external memory device 204 to the RAM 202 to allow the player to play the game. The game window is displayed on the display device 207, and various sounds are output from the audio output device 209. The game player enters various inputs to the game using the input device 211. The CCD camera 216 senses the image near the face of the player during the play, and this image data is captured as an image representing the facial expression of the player during the game.

Figure 3:
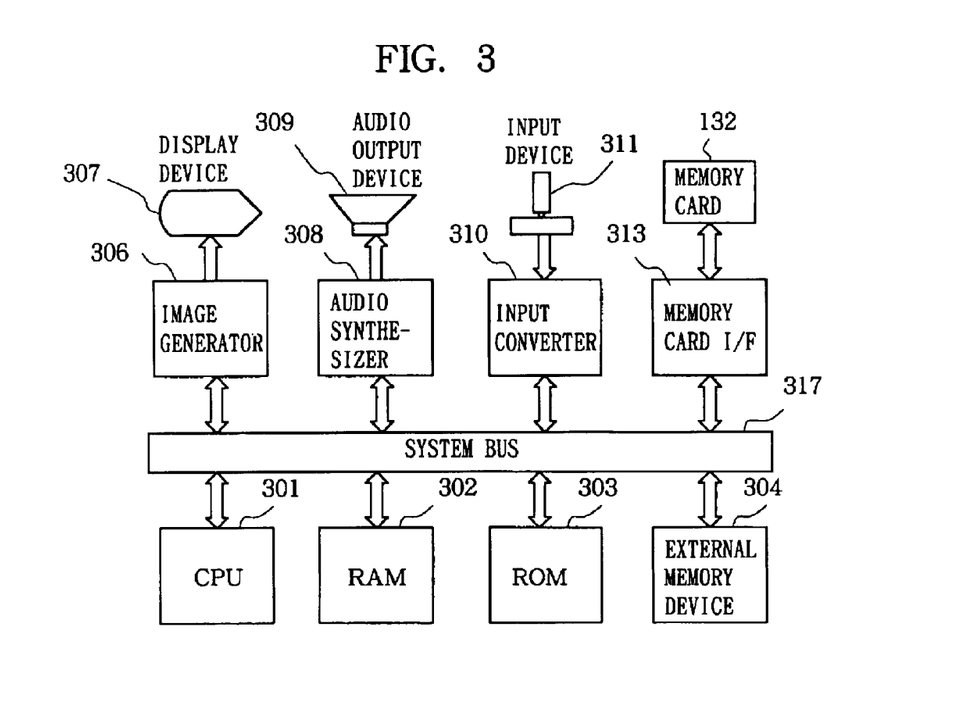
FIG. 3 is a block diagram showing the arrangement of a home game machine.

FIG. 3 shows an arrangement of the home game machine 131 in FIG. 1. The home game machine 131 comprises a CPU 301, RAM 302, ROM 303, external memory device 304, image generator 306, display device 307, audio synthesizer 308, audio output device 309, input converter 310, input device 311, memory card I/F 313, and system bus 317.

These components have the same functions as those shown in FIG. 2. The terminal game machine shown in FIG. 2 is a arcade game machine, while the game machine shown in FIG. 3 is for home use. These game machines have different CPU processing capacities and memory capacities, but have identical basic operations. More specifically, even the game machine in FIG. 3 can load the game program and necessary data to the RAM 302 and allows the player to play the game. The game window is displayed on the display device 307, and various sounds are output from the audio output device 309. The game player enters various operation inputs to the game from the input device 311.

Figure 4:
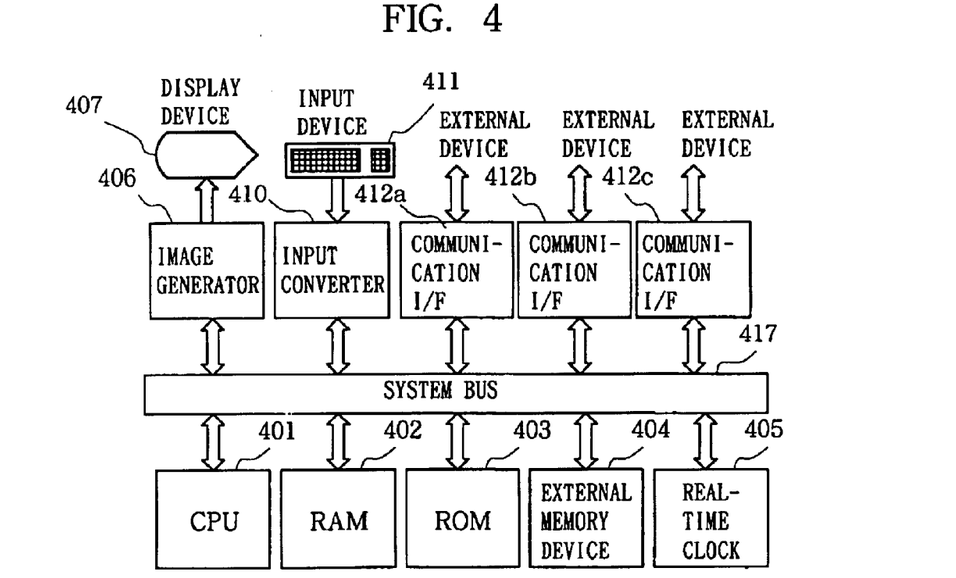
FIG. 4 is a block diagram showing the arrangement of a host computer.

FIG. 4 shows the arrangement of the host computer 101 in FIG. 1. The host computer 101 comprises a CPU 401, RAM 402, ROM 403, external memory device 404, real-time clock 405, image generator 406, display device 407, input converter 410, input device 411, a plurality of communication I/Fs 412a to 412c, . . . , and system bus 417.

The CPU 401 controls the overall operation of this host computer. The RAM 402 is comprised of a programmable memory used for a work area used in operating the CPU 401. The ROM 403 is comprised of a read-only memory which stores various control programs (BIOS: Basic Input/Output System) executed by the CPU 401. The external memory device 404 is comprised of a memory device such as a hard disk for storing various programs and data. The real-time clock 405 is comprised of a clock for determining the current time and date and counting an arbitrary time interval.

The image generator 406 displays various data on the display device 407 on the basis of an instruction from the CPU 401. The input device 411 is comprised of an input device such as a keyboard for inputting various commands to the host computer by the operator. Operation information from the input device 411 is converted into digital data by the input converter 410, and the digital data is output to the CPU 410. The plurality of communication I/Fs 412a to 412c, . . . are comprised of interfaces communicating with the plurality of terminal game machines 111 to 114, . . . The respective communication I/Fs 412a to 412c, . . . are connected to the bus line 417, as illustrated in FIG. 4 but can have arbitrary forms and schemes. For example, an interface (e.g., a Universal Serial Bus) for connecting external devices in a daizy chain may be used.

The overview of the operation of the game system shown in FIGS. 1 to 4 will be described below. In this case, a driving game is exemplified in which parts such as an engine, wheels, chassis, and wing are combined to arrange an automobile (player character), thereby performing a car race.

Each player can tune his own automobile (player character) and can perform a time attack at the home game machine 131 in FIG. 3. The tuning items range from the running performance for the engine, wheels, chassis, and wing to the outer appearance such as the body color and logo. The player repeats tuning and time attack to prepare a faster automobile at the home game machine 131.

Figure 9:
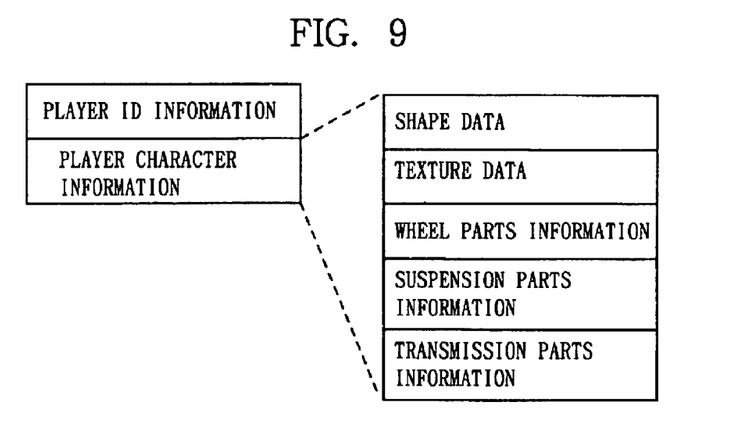
FIG. 9 is a view showing an example of player ID information and character information saved in a memory card.

The player can also save the character information of his own automobile (player character) prepared at the home game machine 131 together with his own player ID information in the memory card 132. The character information includes model information (e.g., shape information and texture information) constituting the player character and parameter information representing the dynamic characteristics of the player character. The parameter information includes information representing which parts are selected as parts (e.g., an engine) pertaining to the running performance, and information representing the body color and logo. FIG. 9 shows an example of player ID information and character information to be saved in the memory card 132.

The player carries this memory card 132 and goes to the location where the terminal game machine shown in FIG. 2 is installed. The player loads the memory card 132 in the terminal game machine to read out the character information. The player can play the driving game with his own automobile (player character) defined by the character information at the terminal game machine. Note that the player can play the game with character information prepared by the player on the spot without reading out the character information from the memory card 132.

At the end of the game at the terminal game machine, when the player attains a certain good result in this game, the terminal game machine stores, in the external memory device 204, character data of the player, player ID information, replay data (e.g., operation information and map information from the start to end of the play of the player) required to play back the play of the player, image data representing the face portion of the player sensed by the CCD camera 216, and the game result data (e.g. a score and time). In this case, not only the race contents, but also individual information such as the machine color and logo (included in the player character information) is stored. The stored data is transferred to the host computer 101 via the network. This transfer is performed without interfering with the progress of the game when no game is played in the terminal game machine.

The host computer 101 shown in FIG. 4 arranges the data transmitted from each terminal game machine and stores it as totalization data in the external memory device 404. More specifically, the data are sorted in the descending order of higher scores or times and stored up to the predetermined rank as the totalization data. The host computer 101 distributes the totalization data to each terminal game machine via the network at predetermined timings. In data distribution, any other data can be added to the totalization data, and the resultant data can be distributed.

Figure 11:
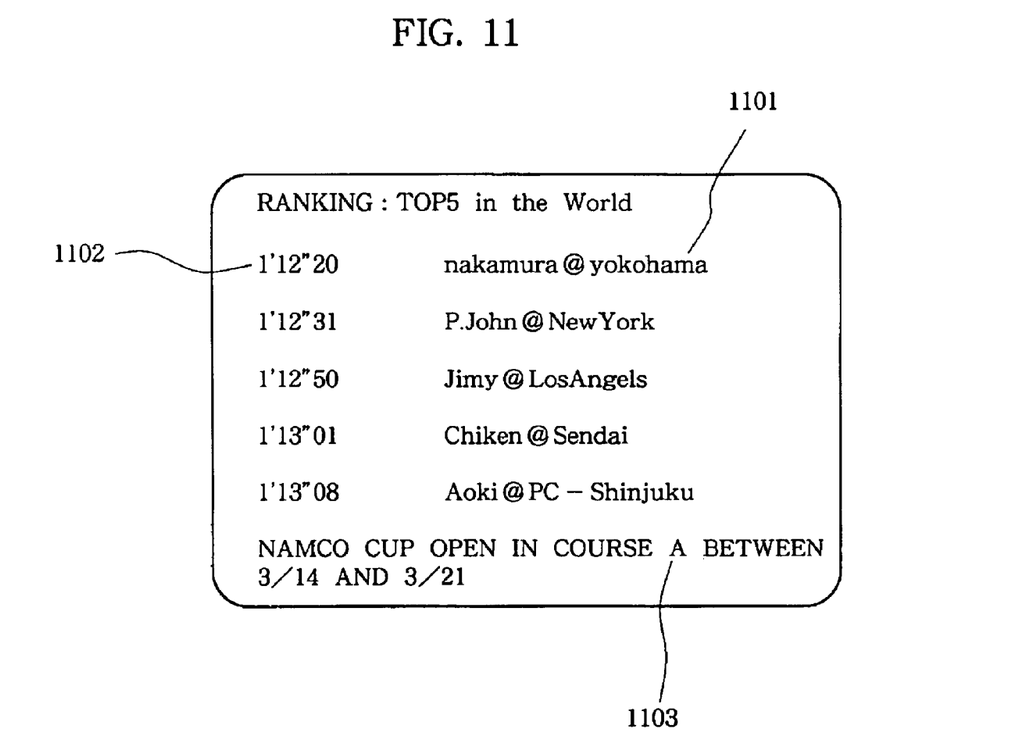
FIG. 11 is a view showing a game ranking display example.

Upon reception of the distributed data, the terminal game machine shown in FIG. 2 stores the received data in the external memory device 204. The terminal game machine displays the game ranking list on the display device 207 on the basis of the totalization data while no player plays the game. FIG. 11 shows the display example of the game ranking list. Reference numeral 1101 denotes player ID information for specifying a player; and 1102, time information as the result of the time attack of each player. Reference numeral 1103 denotes character data transmitted from the host computer 101 together with the totalization data as the data to be displayed in the ranking display window. Note that the face image of each player may be displayed in the ranking window.

When a player plays the game at the terminal game machine to which the totalization data is distributed, data of a predetermined number of higher-ranking players (three players in this case) from the totalization data and plays back the replay data. The replay data represents information stored when the players having the corresponding player IDs took ranking places. The replay data is necessary information for playing back such plays. When the replay data is played back, a player can play the game while playing back running of the higher-ranking players. As a result, any player can play the game as if he were playing the racing game with the remote players. Note that the higher-ranking player data are automatically played back in this case, but an arbitrary player in the displayed ranking places may be selected to play the game. This selection makes it possible to play the game with a player of equivalent competitive level.

Figure 10:
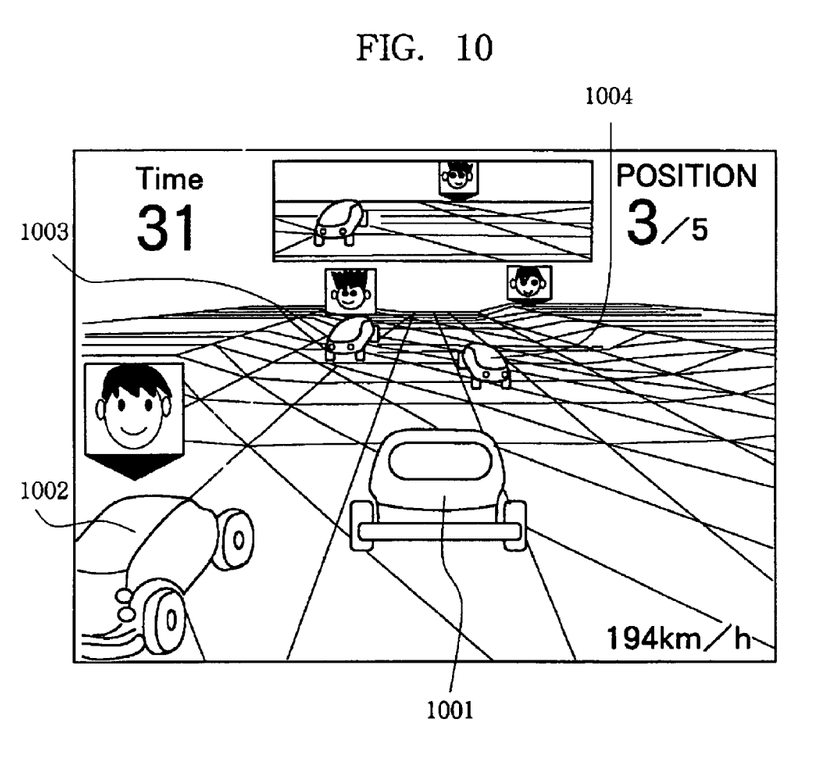
FIG. 10 is a view showing the display window of a game played while replay data of three higher-ranking players are being played back.

FIG. 10 shows the display window example in which a player plays the racing game while playing back the replay data of the three higher-ranking players. Reference numeral 1001 denotes a character of a player who is currently playing the game; and 1002 to 1004, characters (displayed as opaque characters) played back from the totalization data. The characters 1002 to 1004 are moving in the same manner as in the plays with which the players took the ranking places. The face data of the characters are displayed near the playback characters.

The processing sequence of the terminal game machine for realizing the above operation will be described below.

Figure 5:
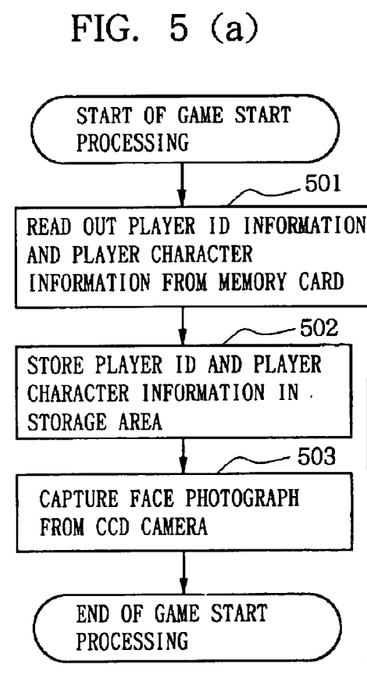
FIG. 5 is a flow chart (No. 1) showing the processing sequence of the terminal game machine.

FIG. 5(*a*) shows processing at the start of the game at the terminal game machine. In step 501, player ID information and character information are read out from the memory card 132. In step 502, these pieces of information are stored in a predetermined storage area of the RAM 202. In step 503, the image near the face of the player is sensed with the CCD camera 216, and this information is also stored in a predetermined storage area of the RAM 202 to complete game start processing. In step 501, ID information and character information input by the player on the spot may be used in place of the data read out from the memory card 132.

FIG. 5(*b*) is a flow chart showing the sequence during the game. During the game, information input by the player from the input device 211 is obtained in step 511. In step 512, the position and posture of his own character (i.e., the character 1001 (FIG. 10) operated by the game player) are calculated. In step 513, process information required for playing back the position and posture of the character is stored in the external memory device 204 as replay data. In step 514, his own character is displayed.

In step 515, the replay data (process information) representing running of the higher-ranking players are extracted from the totalization data transmitted from the host computer 101 in advance and stored in the predetermined storage area of the external memory device 204. In step 516, the positions and postures of the respective characters are calculated from the replay data. In step 517, these competing characters (1002 to 1004 in FIG. 10) are displayed. In step 518, the background and time information are displayed. In step 519, any other processing (e.g., judgment at the goal is performed and camera positions are calculated) is performed. The processing is then ended.

During the game, processing in steps 511 to 519 is repeated. When a predetermined game end condition is satisfied, the game is ended. At this moment, replay data required for playing back the position and posture of the player as the game result are generated and stored in the external memory device 204.

Figure 6:
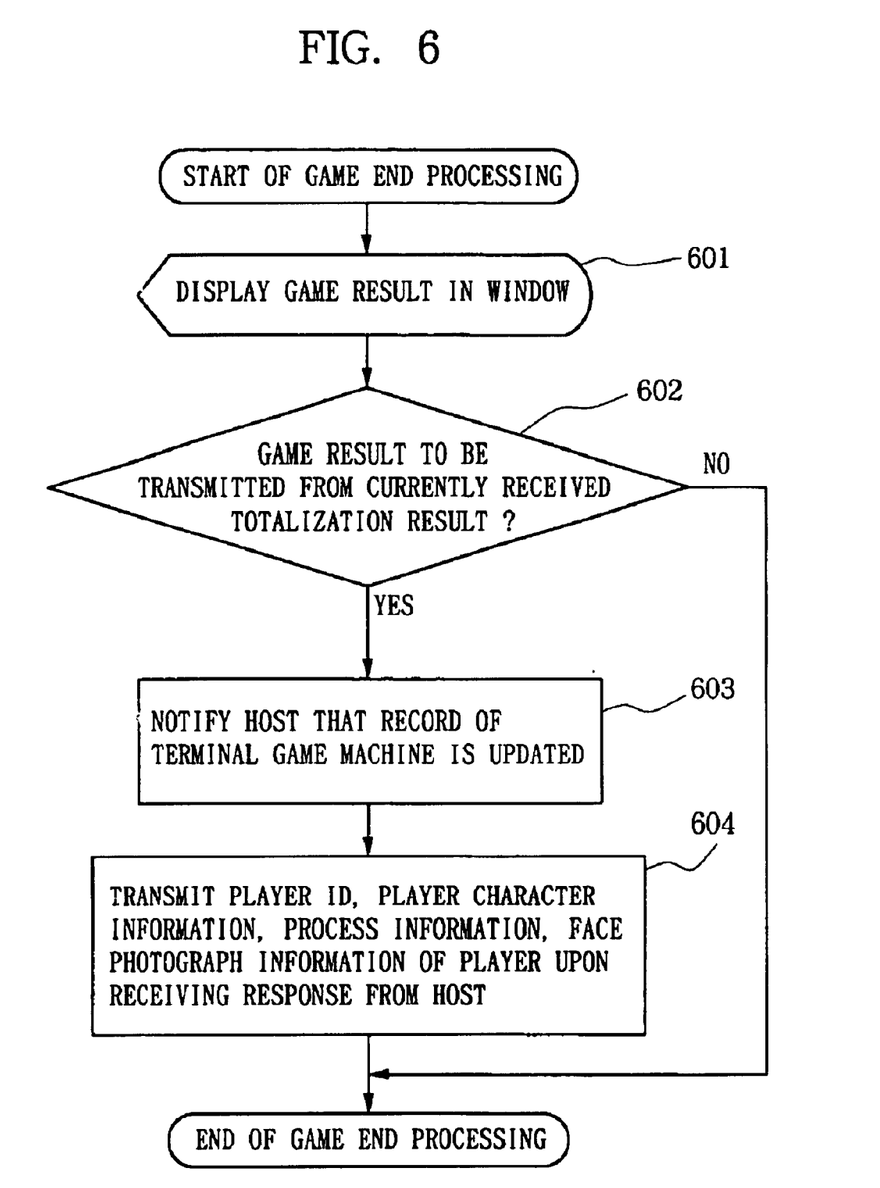
FIG. 6 is a flow chart (No. 2) showing the processing sequence of the terminal game machine.

FIG. 6 shows the processing at the end of the game. At the end of the game, in step 601, the game result is displayed on the display device 207. In step 602, the totalization data stored in the external memory device 207 is compared with the game result of the player to determine whether the game result of the player is to be transmitted. For example, if the time of the player falls within the predetermined ranks as a result of comparison with the totalization data, the CPU determines that the game result must be transmitted. When the game result of the player does not fall within the predetermined ranks, the CPU determines that the game result need not be transmitted and ends the processing. If the game result must be transmitted, the CPU informs the host computer in step 603 that the record of the terminal game machine is updated. In step S604, the CPU waits for the response from the host computer. The CPU then transmits the player ID information, player character information, replay data, and image data of the face portion of the player, and game result to the host computer 101, and the processing is ended.

Figure 7:
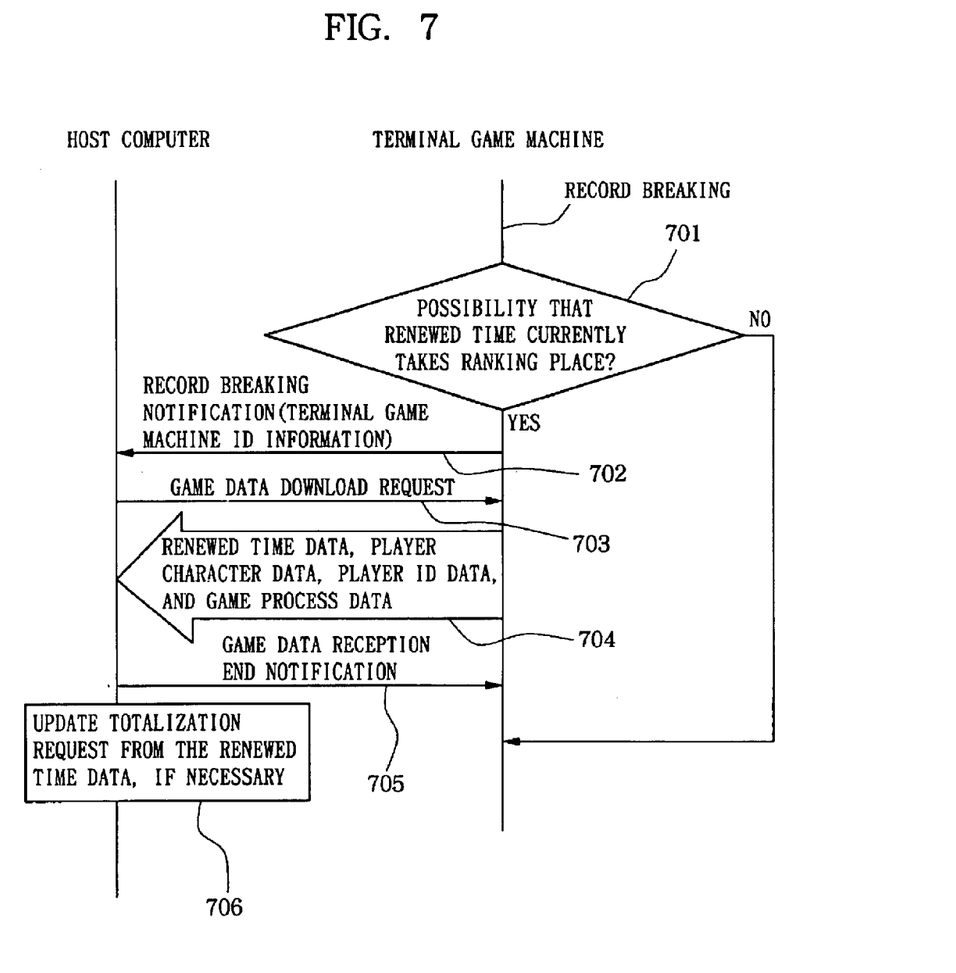
FIG. 7 is a view showing a sequence showing the types of data exchanged between a host computer and the terminal game machine in time updating.

FIG. 7 shows a sequence of the types of data exchanged in time updating between the host computer 101 and the terminal game machine. When a player attains a predetermined good result at the terminal game machine, i.e., when he breaks his own record, it is determined in step 701 whether the renewed record currently takes a ranking place. Step 701 corresponds to step 602 in FIG. 6. If there is no possibility of taking a ranking place, no data is transmitted, and the processing is ended. Otherwise, a record breaking notification (including terminal game machine ID information) is transmitted to the host computer 101, as indicated by an arrow 702. The arrow 702 corresponds to processing in step 603 in FIG. 6. Upon reception of this record breaking notification, the host computer 101 prepares for data reception. When the preparation is complete, the host computer 101 issues a download request for game data, as indicated by an arrow 703.

In response to this download request, the terminal game machine transmits the game result data including the renewed time data, player ID information, player character information, replay data, and image data of the face portion of the player to the host computer 101, as indicated by an arrow 704. Upon reception of these data, the host computer 101 transmits a game data reception end notification 705 to the terminal game machine, as indicated by an arrow 705. The processing of the arrows 703 to 705 corresponds to step 604 in FIG. 6. In step 706, the host computer 101 updates the totalization result from the received data.

Figure 8:
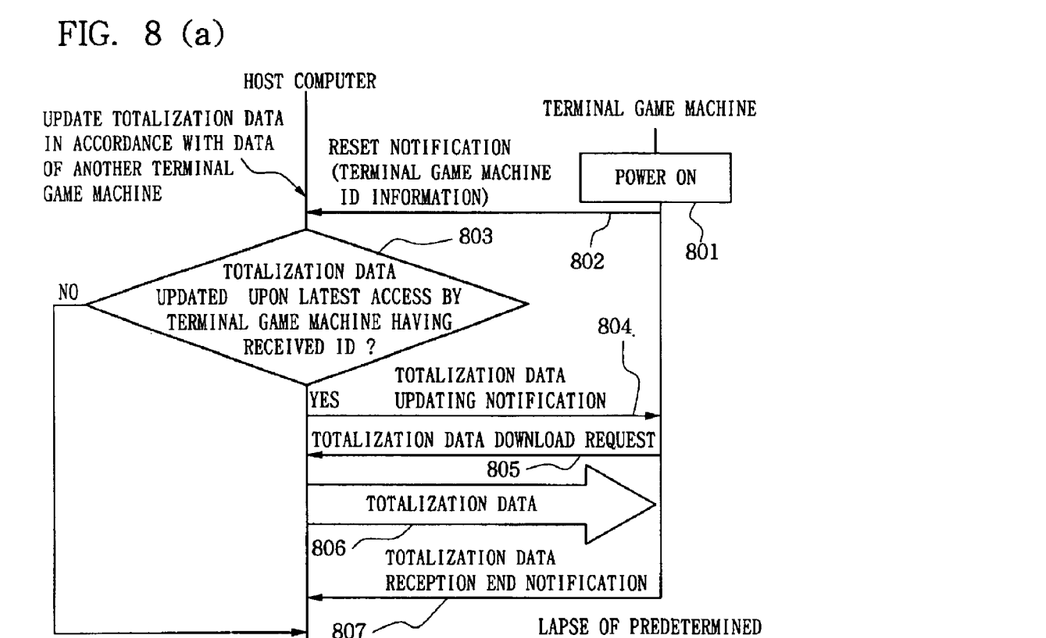
FIG. 8 is a view showing a sequence in which totalization data obtained in the host computer is distributed to the terminal game machine and received by it.

FIG. 8 shows sequences in which the totalization data obtained by the host computer 101 is distributed to the terminal game machine and is received by the terminal game machine. FIG. 8(a) is the sequence in which the totalization data is distributed when the terminal game machine is reset, and FIG. 8(b) is the sequence in which the totalization data is distributed in response to a request from the terminal game machine.

Assume that the totalization data is updated in the host computer 101 by the data transmitted from each terminal game machine in FIG. 8(a). When a terminal game machine of interest is powered on in step 801 (this operation is identical to resetting using a reset switch). As indicated by an arrow 802, this terminal game machine transmits a reset notification (including terminal game machine ID information) to the host computer 101. In step 803, the host computer 101 determines whether the totalization data is updated from the latest access by the terminal game machine having the received ID. If NO in step 803, the processing is ended.

If it is determined in step 803 that the totalization data is updated, a notification representing that the totalization data is updated is transmitted to the terminal game machine, as indicated by an arrow 804. In response to this notification, the terminal game machine sends a totalization data download request to the host computer 101, as indicated by an arrow 805. In response to this download request, the host computer 101 transmits the totalization data to the terminal game machine, as indicated by an arrow 806. As indicated by an arrow 807, upon reception of the totalization data, the terminal game machine transmits the totalization data reception completion notification to the host computer 101, and the processing is ended.

Referring to FIG. 8(b), when the terminal game machine detects that a predetermined period of time has elapsed after accessing the host computer 101, the terminal game machine automatically issues a totalization data updating inquiry (including the terminal game machine ID information), as indicated by an arrow 812. The subsequent processing is identical to the sequence in steps 803 to 807 in FIG. 8(a), and a detailed description thereof will be omitted.

In the above embodiment, the present invention is applied to the driving game, but is not limited to this. The present invention is applicable to a game which achieves a game play in which replay data is obtained and played back, and at the same time an actual game is played while playing back the replay data.

As has been described above, according to the present invention, replay data for playing back the process during which a player plays a game is downloaded via a network, and the player can actually play the game while playing back the replay data. The player can play the game as if he were actually playing the game with remote players. No real-time play process information is exchanged, but the game result data of the player and the replay data for playing back the game process can be communicated at the end of the game, and these data are stored in the terminal game machine. At the time of the game, any player plays the game while playing back the replay data. The players can enjoy the game without any problems posed by communication delays, difference in time, and communication quality. The data distributed to the terminal game machine is stored in the storage means and played back at the time of the game. Even if no communication is established, pseudo game playing can be achieved using the data stored in the storage means. The communications may be performed at low speeds, and the communication timings need not fall within the business hours. Therefore, no load is imposed in game execution.

What is claimed is:

1. A communication game system having a plurality of terminal game machines connected to a network and a host computer, characterized in that each of said plurality of terminal game machines comprises storage means for obtaining and storing replay data for replaying a process of a game play in real time progression when a player plays the game at a corresponding one of said terminal game machines, transmission means for automatically transmitting the replay data stored in said storage means to said host computer, reception means for receiving the replay data automatically transmitted from said host computer, storage means for storing the received replay data, and game execution playback means for playing back the received replay data stored in said storage means and executing the game play in real time progression, said host computer comprising storage means for storing the replay data transmitted from each of said plurality of terminal game machines and transmission means for transmitting the replay data stored in said storage means to each of said plurality of terminal game machines.

2. A communication game system having a plurality of terminal game machines connected to a network and a host computer, characterized in that each of said plurality of terminal game machines comprises storage means for obtaining and storing result data and replay data for replaying a process of a game play in real time progression when each player plays the game at a corresponding one of said terminal game machines, transmission means for automatically transmitting the result data and replay data stored in said storage means to said host computer, reception means for receiving totalization data automatically transmitted from said host computer, storage means for storing the received totalization data, and game execution playback means for reading out and playing back the replay data from the received totalization data stored in the said storage means and at the same time executing the game play in real time progression, said host computer comprising totalization means for totalizing the result data transmitted from each of said plurality of terminal game machines, and generating totalization data containing the result data transmitted, storage means for storing the generated totalization data, and transmission means for transmitting the totalization data stored in said storage means to each of said plurality of terminal game machines.

3. A communication game system according to claim 1 or 2, characterized in that said terminal game machine has an interface connecting detachable storage means to allow data readout, said game execution playback means of said terminal game machine reads out player character information serving as information associated with a game character and stored in said detachable storage means and reflects the readout player character information on the game, and said transmission means of said terminal game machine makes data transmitted to said host computer contain the player character information, and transmits the resultant data.

4. A communication game system according to claim 3, characterized in that the player character information stored in said detachable storage means is created and stored by game machine not connected to said network but having an interface connecting said detachable storage means and reading/writing data.

5. A communication game system according to claim 1 or 2, characterized in that said terminal game machine comprises image sensing means for obtaining image data obtained by sensing an image of a game player who plays the game, said transmission means of said terminal game machine makes data transmitted to said host computer contain the image and transmits the resultant data, said transmission means of said host computer makes data transmitted to said plurality of terminal game machines contain the image data and transmits the resultant data, and said game execution playback means of said terminal game machine displays the image data corresponding to the replay data in playing back the replay data.

* * * * *